(12) United States Patent
Shimizu et al.

(10) Patent No.: US 9,231,237 B2
(45) Date of Patent: Jan. 5, 2016

(54) CELL MODULE

(75) Inventors: Keisuke Shimizu, Osaka (JP);
Tomohiko Yokoyama, Osaka (JP);
Masato Fujikawa, Osaka (JP); Keisuke Naito, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 39 days.

(21) Appl. No.: 13/807,672

(22) PCT Filed: May 31, 2011

(86) PCT No.: PCT/JP2011/003047
§ 371 (c)(1),
(2), (4) Date: Dec. 28, 2012

(87) PCT Pub. No.: WO2012/017586
PCT Pub. Date: Feb. 9, 2012

(65) Prior Publication Data
US 2013/0095356 A1    Apr. 18, 2013

(30) Foreign Application Priority Data
Aug. 6, 2010   (JP) .................................. 2010-177639

(51) Int. Cl.
*H01M 2/12*   (2006.01)
*H01M 2/10*   (2006.01)

(52) U.S. Cl.
CPC .......... *H01M 2/1223* (2013.01); *H01M 2/1077* (2013.01); *H01M 2/1241* (2013.01)

(58) Field of Classification Search
CPC   H01M 2/1077; H01M 2/1223; H01M 2/1241

USPC .......................................................... 429/88
See application file for complete search history.

(56) References Cited

U.S. PATENT DOCUMENTS 2,294,427 A * 9/1942 Spicer .............................. 429/54
2004/0091769 A1* 5/2004 Kawabata et al. ............ 429/163
(Continued)

FOREIGN PATENT DOCUMENTS

| JP | 2002-008603 A | 1/2002 |
| JP | 2002-008603 A | 1/2002 |

(Continued)

OTHER PUBLICATIONS

International Search Report issued in International Application No. PCT/JP2011/003047 dated Aug. 30, 2011.

*Primary Examiner* — Stewart Fraser
*Assistant Examiner* — Olatunji Godo
(74) *Attorney, Agent, or Firm* — McDermott Will & Emery LLP

(57) ABSTRACT

Batteries 100 are accommodated in a case 20, wherein the batteries 100 each include an opening portion 8a for releasing gas produced in an associated one of the batteries to outside the battery, the case 20 is partitioned into an accommodation section 50 configured to accommodate the batteries 100 and an exhaust passage 60 configured to expel the gas released from at least one of the opening portions 8a of the batteries 100 to outside the case 20, the opening portions 8a of the batteries 100 are allowed to communicate with the exhaust passage 60 through sealed connection passages 40, and a one-way open valve 70 which is configured to open only along a direction from the opening portion 8a of the battery 100 to the exhaust passage 60 is provided in an intermediate portion or at an end of each of the connection passages 40.

11 Claims, 10 Drawing Sheets

(56) References Cited

U.S. PATENT DOCUMENTS

| | | | |
|---|---|---|---|
| 2010/0266880 A1* | 10/2010 | Hirakawa et al. | ............ 429/53 |
| 2012/0164490 A1 | 6/2012 | Itoi et al. | |

FOREIGN PATENT DOCUMENTS

| | | |
|---|---|---|
| JP | 2003-100267 A | 4/2003 |
| JP | 2003-100267 A | 4/2003 |
| JP | 2004-039582 A | 2/2004 |
| JP | 2004-039582 A | 2/2004 |
| JP | 2007-027011 A | 2/2007 |
| JP | 2010-287514 A | 12/2010 |
| JP | 2010-287514 A | 12/2010 |
| JP | 2011-065906 A | 3/2011 |
| WO | WO 2008/026854 * | 3/2008 |
| WO | WO2009110167 * | 9/2009 |

* cited by examiner (a)

(b)

(a)

(b)

(a)

(b)

(c)

(a)

(b)

(a)

(b)

(c)

(d)

(e)

ns of M") are not part# CELL MODULE

RELATED APPLICATIONS

This application is the U.S. National Phase under 35 U.S.C. §371 of International Application No. PCT/JP2011/003047, filed on May 31, 2011, which in turn claims the benefit of Japanese Application No. 2010-177639, filed on Aug. 6, 2010, the disclosures of which Applications are incorporated by reference herein.

TECHNICAL FIELD

The present disclosure relates to battery modules including a plurality of batteries accommodated in a case.

BACKGROUND ART

Battery packs including a plurality of batteries accommodated in a case to allow an output of a predetermined voltage and capacitance are widely used as power supplies of various devices, vehicles, etc. The technique of forming modules of battery assemblies obtained by connecting general-purpose batteries in parallel and/or in series to output a predetermined voltage and capacitance, and of combining the resultant battery modules together to be applicable to various applications has begun to be adopted. This module forming technique can reduce the size and weight of the battery modules themselves by enhancing the performance of batteries accommodated in the battery modules. Thus, this module forming technique has various advantages: for example, workability in assembling a battery pack can be improved, and the flexibility in mounting battery modules in a limited space, such as a vehicle, can be increased.

On the other hand, as the performance of batteries accommodated in battery modules is enhanced, in addition to ensuring safety of individual batteries, it becomes more and more important to ensure safety of the battery modules constituted of multiple batteries. In particular, when heat generated due to, e.g., an internal short circuit in a battery produces gas, and the high-temperature gas is released to outside the battery by means of operation of a safety valve, neighboring batteries are subjected to the high-temperature gas. In this case, normal batteries affected by the high-temperature gas may be deteriorated in a chain reaction.

To solve the above discussed problems, Patent Document 1 describes a power supply device in which a case accommodating a plurality of batteries is partitioned by a partitioning wall into a battery chamber accommodating the batteries, and an exhaust chamber through which high-temperature gas released from the batteries is expelled, wherein the power supply device includes an exhaust mechanism which is configured such that openings of safety valves of the batteries are in communication with the exhaust chamber. With the exhaust mechanism thus configured, the high-temperature gas released through the safety valves of the batteries is caused to flow into the exhaust chamber without flowing into the battery chamber, and is expelled to outside the case through a vent of the case. This mechanism can prevent the high-temperature gas from filling the battery chamber and from coming into contact with the neighboring batteries, and thereby can reduce the influence on the normal batteries.

CITATION LIST

Patent Document

PATENT DOCUMENT 1: Japanese Patent Publication No. 2007-27011

SUMMARY OF THE INVENTION

Technical Problem

The exhaust mechanism described in Patent Document 1 is advantageous in that the exhaust chamber has a hermetically sealed structure such that gas flowing through openings of the batteries into the exhaust chamber can be prevented from flowing into the battery chamber again and deterioration of the normal batteries occurring in a chain reaction can be reduced.

In the technique described in Patent Document 1, however, since the openings of the safety valves of the batteries are in communication with the exhaust chamber via penetration portions, the high-temperature gas having flowed into the exhaust chamber might come into contact with the neighboring batteries through the associated penetration portions and exert an adverse thermal influence on the normal batteries It is therefore a principal object of the present disclosure to provide a highly safe battery module including an exhaust passage configured to expel gas produced in a battery to the outside, wherein it is possible to prevent the high-temperature gas released from the battery from coming into contact with neighboring batteries through the exhaust passage.

Solution to the Problem

To achieve the above object, a battery module of the present disclosure has a configuration in which: opening portions configured to release gas produced in batteries are allowed to communicate, on battery-by-battery basis, with an exhaust passage configured to expel the gas released from at least one of the opening portions of the batteries to the outside, via an associated one of sealed connection passages; and a one-way open valve configured to open only along the direction from the opening portion of the battery to the exhaust passage is provided in an intermediate portion or at an end of each of the connection passages.

Thus, a battery module of the present disclosure includes a plurality of batteries accommodated in a case, wherein the batteries each include an opening portion configured to release gas produced in an associated one of the batteries to outside the battery, the case is partitioned into an accommodation section configured to accommodate the batteries and an exhaust passage configured to expel the gas released from at least one of the opening portions of the batteries to outside the case, the opening portions of the batteries are allowed to communicate with the exhaust passage through sealed connection passages, and a one-way open valve which is configured to open only along a direction from the opening portion of the battery to the exhaust passage is provided in an intermediate portion or at an end of each of the connection passages.

With this configuration, when high-temperature gas released from at least one of the opening portions of the batteries causes the associated one-way open valve to open, the high-temperature gas flowing into the exhaust passage through the associated connection passage is not allowed to come into contact with neighboring batteries through the other connection passages (whose one-way open valves are in blocking states), and is expelled to outside the case, resulting in that a thermal influence on the neighboring batteries can be reduced.

Advantages of the Invention

According to the present disclosure, even when a failure occurs and at least one of the batteries accommodated in the battery module releases gas, the high-temperature gas flowing into the exhaust passage can be expelled to the outside without coming into contact with the neighboring batteries. Therefore, the present disclosure can provide a battery module with a high level of safety.

DESCRIPTION OF EMBODIMENTS

An embodiment of the present disclosure will be described in detail below with reference to the drawings. The present disclosure is not limited to the following embodiment. The embodiment can be modified without deviating from the effective scope of the present disclosure. The embodiment can be combined with other embodiments.

First Embodiment

Figure 1:
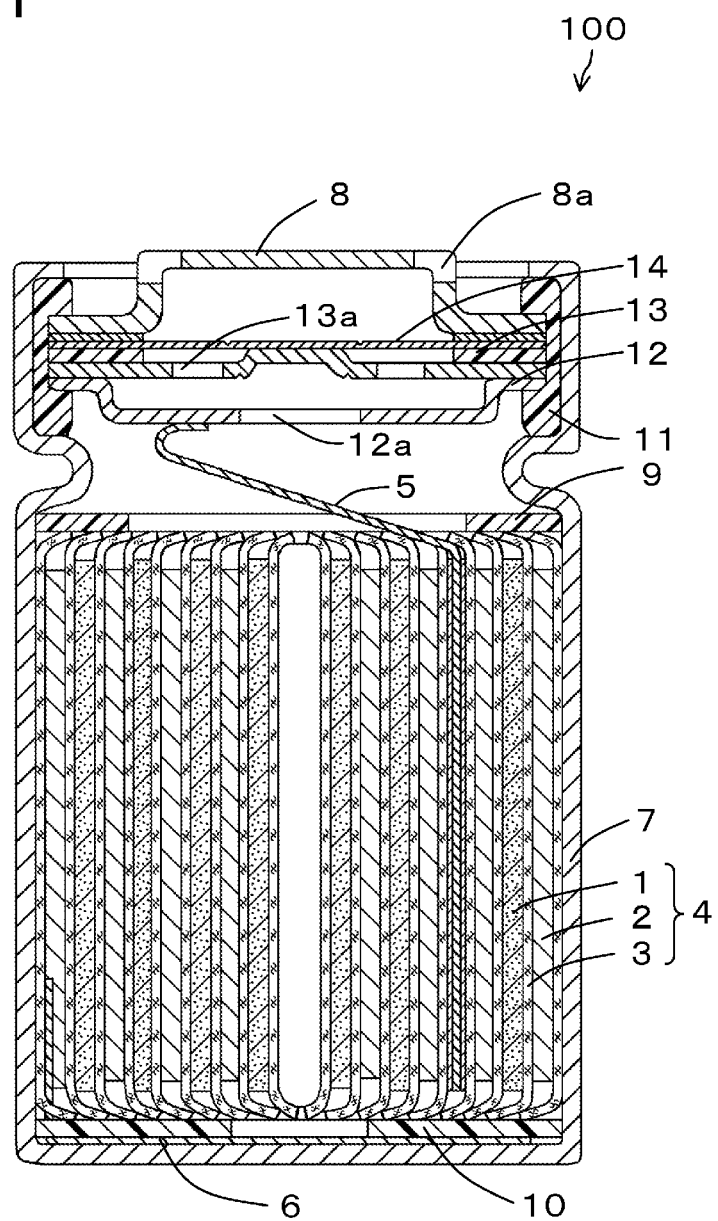
FIG. 1 is a cross-sectional view schematically illustrating a configuration of a battery to be used in a battery module according to a first embodiment of the present disclosure.

FIG. 1 is a cross-sectional view schematically illustrating a configuration of a battery 100 to be used in a battery module according to a first embodiment of the present disclosure.

As the battery 100 to be used in the battery module of this embodiment, for example, a cylindrical lithium ion secondary battery as illustrated in FIG. 1 can be employed. Generally, a lithium ion secondary battery includes a safety mechanism to release gas to outside the battery when the pressure in the battery increases due to occurrence of, for example, an internal short circuit. A specific configuration of the battery 100 will be described below with reference to FIG. 1.

As illustrated in FIG. 1, an electrode group 4 formed by winding a positive electrode 1 and a negative electrode 2 with a separator 3 interposed between the electrodes 1 and 2 is accommodated in a battery case 7 together with a nonaqueous electrolyte (not shown). Insulating plates 9 and 10 are disposed above and under the electrode group 4, respectively. The positive electrode 1 is joined to a filter 12 via a positive electrode lead 5, and the negative electrode 2 is joined to a bottom portion of the battery case 7 via a negative electrode lead 6. The bottom portion of the battery case 7 also serves as a negative electrode terminal.

The filter 12 is connected to an inner cap 13, and a projection of the inner cap 13 is joined to a metallic release valve 14. Moreover, the release valve 14 is connected to a terminal plate 8 also serving as a positive electrode terminal. The terminal plate 8, the release valve 14, the inner cap 13, and the filter 12 collectively seal an opening of the battery case 7 via a gasket 11.

When the pressure in the battery 100 is increased due to occurrence of, for example, an internal short circuit in the battery 100, the release valve 14 expands toward the terminal plate 8, and the inner cap 13 and the release valve 14 are disjoined, resulting in an interruption of a current path. When the pressure in the battery 100 further increases, the release valve 14 ruptures. Thus, gas produced in the battery 100 is caused to pass via a through hole 12a of the filter 12, a through hole 13a of the inner cap 13, the ruptured part of the release valve 14, and an opening portion 8a of the terminal plate 8, to be expelled to the outside.

Note that the safety mechanism for releasing the gas produced in the battery 100 to the outside is not limited to the structure illustrated in FIG. 1, and may have other structures. The position of the opening portion 8a configured to release the gas produced in the battery 100 to outside the battery 100 is not limited to the position illustrated in FIG. 1. For example, the opening portion 8a may be located at the center of a protrusion of the terminal plate 8.

Figure 2:
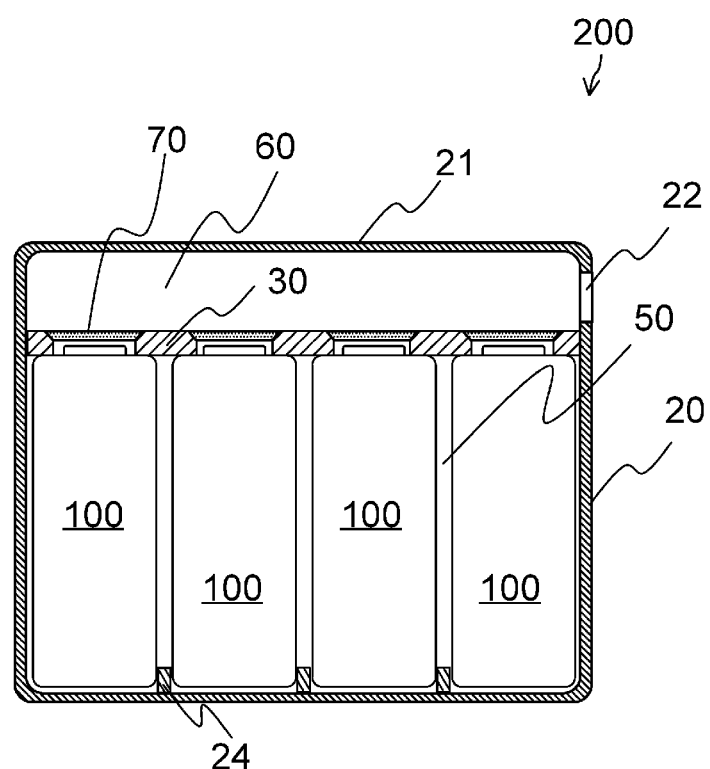
FIG. 2(a) is a cross-sectional view schematically illustrating a battery module of the first embodiment.
FIG. 2(b) is an enlarged view illustrating a part of FIG. 2(a).
Figure 2:
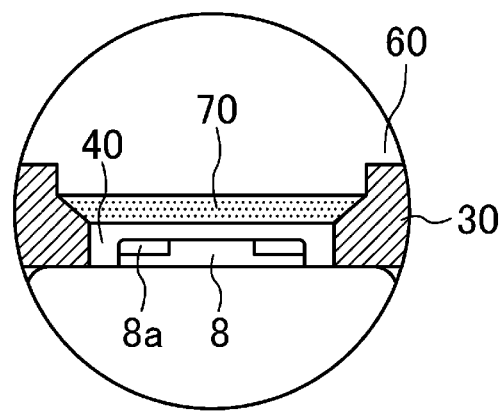

FIG. 2(a) is a cross-sectional view schematically illustrating a battery module 200 of this embodiment. FIG. 2(b) is an enlarged view illustrating a part of FIG. 2(a).

As illustrated in FIG. 2(a), the battery module 200 has a configuration in which a plurality of the batteries 100 are accommodated in a case 20. Each of the batteries 100 is fixed by ribs 24 formed on a bottom portion 23 of the case 20 at a predetermined position. As illustrated in FIG. 1, the batteries 100 each include the opening portion 8a configured to release the gas produced in the associated battery 100 to outside the battery 100.

The case 20 is partitioned by a flat plate 30 provided at one side of the batteries 100 (in this embodiment, at the side near the positive electrode terminal 8) into an accommodation section 50 configured to accommodate a plurality of the batteries 100 and an exhaust passage 60 configured to expel the gas released from at least one of the opening portions 8a of the batteries 100 to outside the case 20.

As illustrated in FIG. 2(b), each of the opening portions 8a of the batteries 100 is allowed to communicate with the exhaust passage 60 via a sealed connection passage 40. In this embodiment, the opening portions 8a are each formed in the protrusion 8 (i.e. the terminal plate 8) of the battery 100, and the flat plate 30 is placed in such a manner that each of the protrusions 8 of the batteries 100 is inserted into an associated one of through holes formed in the flat plate 30 and the battery cases are in contact with the flat plate 30 at portions surrounding the protrusions 8 of the batteries 100. Each of the through holes of the flat plate 30 forms an associated one of the connection passages 40, and a one-way open valve 70 configured to open only along the direction from the opening portion 8a of the battery 100 to the exhaust passage 60 is provided in each of the connection passages 40.

In a normal state, each of the connection passages 40 configured to allow communication between the opening portions 8a of the batteries 100 and the exhaust passage 60 is blocked by the associated one-way open valve 70. When a failure occurs, the one-way open valve 70 is opened by a release of gas from the associated one of the opening portions 8a of the batteries 100. Since the flat plate 30 is in contact with the one side of the batteries 100, the connection passages 40 are sealed by the flat plate 30. Consequently, when the high-temperature gas released from at least one of the opening portions 8a of the batteries 100 causes an associated one of the one-way open valves 70 to open, the high-temperature gas flowing into the exhaust passage 60 through the associated connection passage 40 is not allowed to come into contact with the neighboring ones of the batteries 100 through the other connection passages 40 (whose one-way open valves 70 are in locking states), and is expelled to outside the case 20 through a vent 22 provided in the case 20.

Note that since the flat plate 30 is in contact with the one side of the batteries 100, the accommodation section 50 is also sealed by the flat plate 30. Therefore, the high-temperature gas having flowed from the opening portion 8a of the battery 100 into the exhaust passage 60 through the connection passage 40 is not allowed to flow into the accommodation section 50 again.

A configuration of the one-way open valve 70 of this embodiment will be described below with reference to FIG. 2(b).

As illustrated in FIG. 2(b), the connection passage 40 configured to connect the opening portion 8a to the exhaust passage 60 is blocked by the one-way open valve 70. The one-way open valve 70 in a blocking state interrupts the communication between a portion of the connection passage 40 facing the battery 100 and a portion of the connection passage 40 facing the exhaust passage 60.

In this embodiment, each of the connection passages 40 is constituted of an associated one of through holes formed in the flat plate 30, and includes a tapered part which is located in a portion of the inner surface and conically tapered toward the battery 100. Each of the one-way open valves 70 has a conical shape corresponding to the shape of the tapered part of the connection passages 40, and is placed in contact with or pressed into the tapered part. This configuration allows the one-way open valves 70 to open only toward the exhaust passage 60.

When a failure occurs in at least one of the batteries 100, gas is released from the opening portion 8a of the battery 100 experiencing the failure, and accordingly, in the connection passage 40 of the battery 100 experiencing the failure, a pressure in the portion facing the battery 100 exceeds a pressure in the portion facing the exhaust passage 60, thereby causing the associated one-way open valve 70 to open. At this time, the gas released from the battery 100 experiencing the failure flows through the associated connection passage 40 into the exhaust passage 60. Consequently, in each of the passages 40 of the neighboring batteries 100, a pressure in the portion facing the exhaust passage 60 exceeds a pressure in the portion facing the batteries 100, resulting in that the one-way open valves 70 of the neighboring batteries do not open to remain in a blocking state.

Accordingly, when a failure occurs and at least one of the batteries 100 accommodated in the battery module 200 releases gas, the one-way open valve 70 provided in the connection passage 40 of the battery 100 releasing the gas is opened toward the exhaust passage 60, and the gas released from the battery 100 experiencing the failure flows into the exhaust passage 60 through the connection passage 40. At this time, since the one-way open valves 70 provided in the connection passages 40 of the neighboring batteries remain in blocking states, the gas having flowed into the exhaust passage 60 is expelled to outside the case 20 through the vent 22 without coming into contact with the neighboring batteries 100. In this manner, a thermal influence which the gas released from the battery 100 experiencing the failure exerts on the neighboring batteries 100 can be reduced.

In the present disclosure, the "one-way open valve 70" refers to an open valve which is configured to open only along the direction from the opening portion 8a to the exhaust passage 60 depending on a pressure difference between the portion facing the battery 100 and the portion facing the exhaust passage 60 of the connection passage 40 in which the one-way open valve 70 is provided, and the configuration of the one-way open valve 70 is not limited to a specific one. In each of the connection passages 40, a pressure in the portion facing the battery 100 and a pressure in the portion facing the exhaust passage 60 depend on a pressure of gas released from an associated one of the opening portions 8a of the batteries 100 when a failure occurs. The position at which the one-way open valves 70 is provided in the connection passage 40 is not particularly limited. For example, the valve 70 may be provided in an end (an end facing the battery 100 or an end facing the exhaust passage 60) of the connection passage 40, instead of the intermediate portion as illustrated in FIG. 2(b).

In the present disclosure, the configuration of the "connection passages 40" is not particularly limited, and any configuration may be applicable as long as each of the connection passages 40 is sealed and allows independent communication between the associated one of the opening portions 8a of the batteries 100 and the exhaust passage 60 on a battery-by-battery basis. The connection passages 40 may be formed integrally with the exhaust passage 60 or the bodies of the batteries 100.

In this embodiment, as illustrated in FIG. 2(a), the flat plate 30, which is placed in such a manner that the battery cases are in contact with the flat plate 30 at portions surrounding the protrusions 8 (i.e. the positive electrode terminals 8) of the batteries 100, separates the accommodation section 50 configured to accommodate the batteries 100 from the exhaust passage 60. At the same time, the through holes of the flat plate 30 into which the protrusions 8 of the batteries 100 are inserted serve as the connection passages 40. In this manner, the flat plate 30 can hermetically isolate the accommodation section 50 from the exhaust passage 60 and seal the connection passages 40.

(Variations of First Embodiment)

Figure 3:
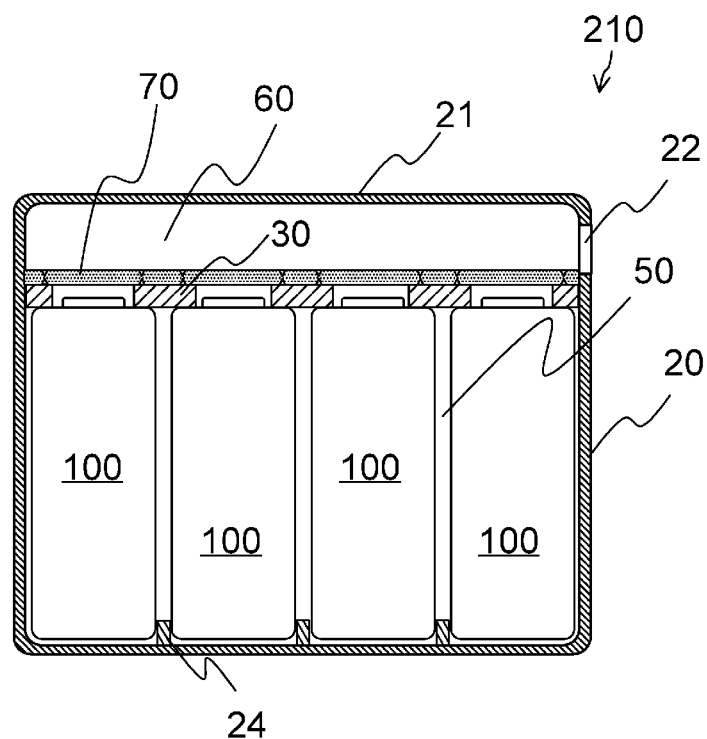
FIG. 3(a) is a cross-sectional view schematically illustrating a configuration of a battery module according to a variation of the first embodiment.
FIG. 3(b) is an enlarged view illustrating a part of the FIG. 3(a).
Figure 3:
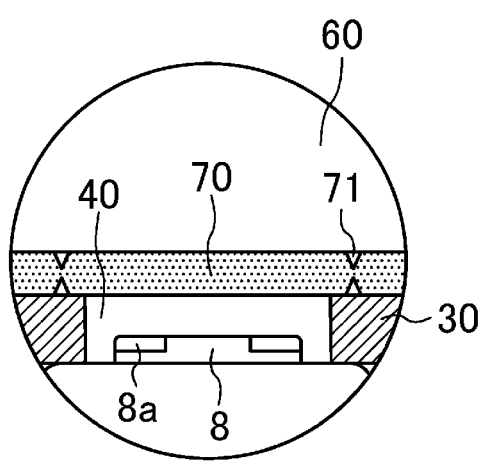

FIG. 3(a) is a cross-sectional view schematically illustrating a configuration of a battery module 210 according to a variation of the first embodiment. FIG. 3(b) is an enlarged view illustrating a part of the FIG. 3(a). This variation exemplifies a different form of the one-way open valves 70 illustrated in FIG. 2(a), and has the same configuration as that of the battery module 200 except for the one-way open valves.

As illustrated in FIG. 3(a), the case 20 is partitioned by the flat plate 30 provided at one side of a plurality of the batteries 100 into the accommodation section 50 configured to accommodate a plurality of the batteries 100 and the exhaust passage 60 configured to expel the gas released from at least one of the opening portions 8a of the batteries 100.

As illustrated in FIG. 3(b), the flat plate 30 is placed in such a manner that each of the protrusions 8 of the batteries 100 is inserted into an associated one of the through holes formed in the flat plate 30 and the battery cases are in contact with the flat plate 30 at portions surrounding the protrusions 8 of the batteries 100. The through holes of the flat plate 30 form the connection passages 40 which allow the communication between the opening portions 8a of the batteries 100 and the exhaust passage 60.

A plate member 70 is placed in contact with the surface of the flat plate 30 facing the exhaust passage 60 so as to close the through holes of the flat plate 30. The plate member 70 has thinner portions 71 formed in regions which are located near the through holes and in contact with the flat plate 30. In this variation, the thinner portions 71 constitute the one-way open valves.

Specifically, when a failure occurs in at least one of the batteries 100, gas is leased from the opening portion 8a of the battery 100 experiencing the failure, and accordingly, in the connection passage 40 of the battery 100 experiencing the failure, a pressure in a portion facing the battery 100 exceeds a pressure in a portion facing the exhaust passage 60. Consequently, a predetermined pressure is applied to the plate member 70, thereby causing the thinner portions 71 associated with the battery 100 experiencing the failure to rupture, that is, the one-way open valve is opened. At this time, the gas released from the battery 100 experiencing the failure flows through the associated connection passage 40 into the exhaust passage 60. Accordingly, in each of the passages 40 of the neighboring batteries 100, a pressure in the portion facing the exhaust passage 60 exceeds a pressure in the portion facing the batteries 100. However, being formed in the regions of the plate member 70 which are in contact with the flat plate 30, the thinner portions 71 associated with the neighboring batteries do not rupture even when the predetermined pressure is applied to the plate member 70. Thus, the thinner portions 71 formed in this manner can constitute the one-way open valves which can be opened only along the direction from the opening portion 8a of the battery 100 to the exhaust passage 60.

The thinner portions 71 may be formed on both surfaces or one surface of the plate member 70 as long as the thinner portions 71 are located in regions being in contact with the flat plate 30. The shape (for example, a ring shape or a linear shape) and the number of the thinner portions 71 are not particularly limited.

Figure 4:
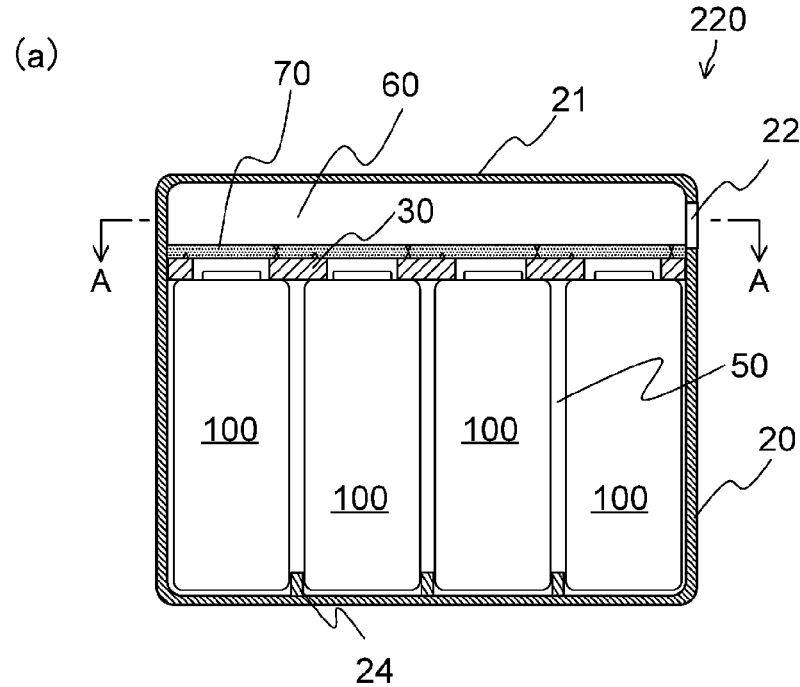
FIG. 4(a) is a cross-sectional view schematically illustrating a configuration of a battery module according to another variation of the first embodiment.
FIG. 4(b) is an enlarged view of a part of FIG. 4(a).
FIG. 4(c) is a cross-sectional view taken along the line A-A in FIG. 4(a).
Figure 4:
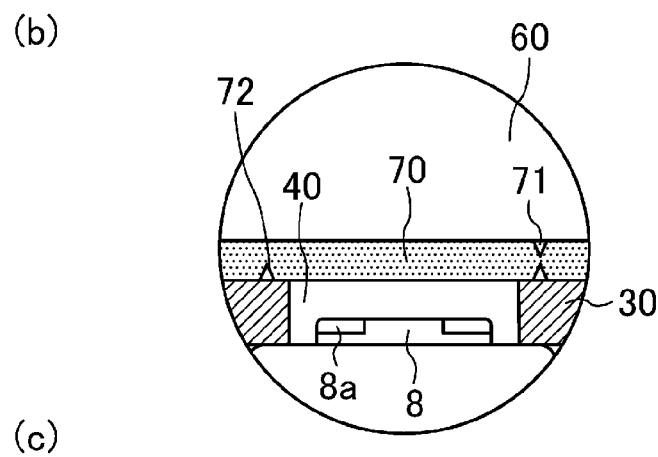
Figure 4:
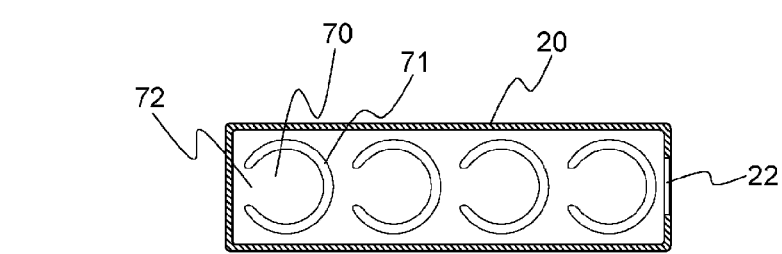

FIG. 4(a) is a cross-sectional view schematically illustrating a configuration of a battery module 220 according to another variation of the first embodiment. FIG. 4(b) is an enlarged view of a part of FIG. 4(a). FIG. 4(c) is a cross-sectional view taken along the line A-A in FIG. 4(a). This variation exemplifies another form of the one-way open valves 70 illustrated in FIG. 3(a), and has the same configuration as that of the battery module 210 except for the one-way open valves.

Each of the one-way open valves of this variation further includes a non-rupturable portion 72 formed in a part of the associated one of the thinner portions 71 illustrated in FIGS. 3(a) and 3(b).

Specifically, as illustrated in FIGS. 4(a) and 4(c), thinner portions 71 formed on the plate member 70 have, in its part, the non-rupturable portion 72. As illustrated in FIG. 4(c), the non-rupturable portion 72 can be formed, for example, by forming a thinner portion 71 in a ring shape on the surface of the plate member 70 facing the battery 100 and forming another thinner portion 71 in a semi-ring shape lacking a part of its circumference on the surface of the plate member 70 facing the exhaust passage 60.

Figure 5:
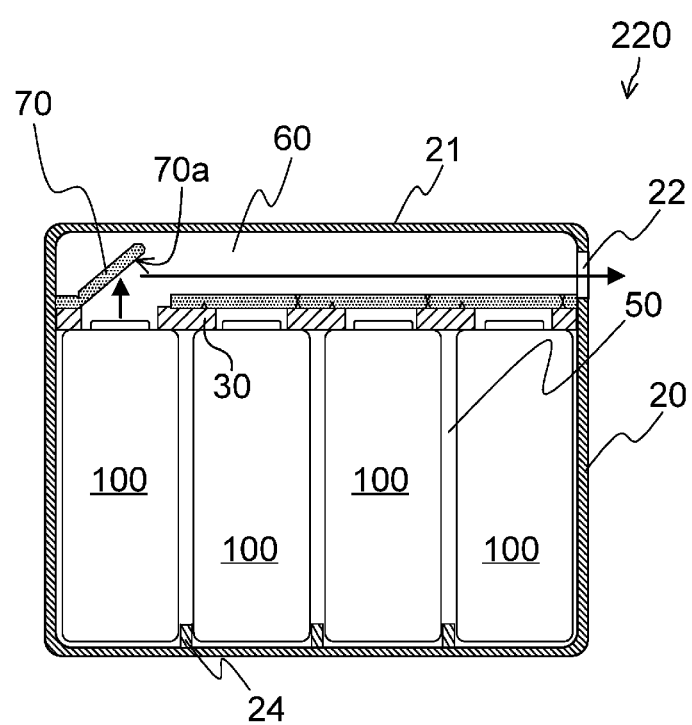
FIG. 5(a) is a cross-sectional view illustrating a one-way open valve of FIG. 4(a) in an opened state.
FIG. 5(b) is a side view of the one-way open valve of FIG. 4(a) in an opened state.
Figure 5:
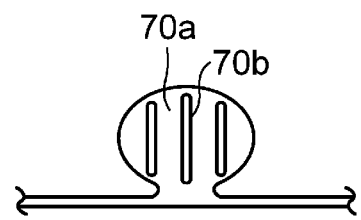

The one-way open valve constituted of the thinner portions 71 having the above described shapes functions in the following manner. When a failure occurs and gas is released from at least one of the opening portions 8a of the batteries 100, the associated thinner portions 71 rupture, i.e., the one-way open valve is opened toward the exhaust passage 60, whereas the non-rupturable portion 72 formed in a part of the thinner portion 71 causes, as illustrated in FIG. 5(a), the one-way open valve to stay in an opened state with an inclination in a specific direction without being completely separated from the plate member 70. Accordingly, the gas released from the opening portion 8a of the battery 100 to the exhaust passage 60 through the connection passage 40 can be quickly expelled to outside the case 20 by adjusting the inclination of the opened state such that flow of the gas is directed toward the vent 22 of the exhaust passage 60. In this manner, the thermal influence exerted on the neighboring batteries 100 can be further reduced. Note that the inclination of the opened state can be controlled by modifying, for example, the shapes and/or positions of the thinner portion 71 and the non-rupturable portion 72.

FIG. 5(b) illustrates a member 70b (for example, a rib) provided on the plate member 70. The member 70b is formed on a surface 70a of a region serving as the one-way open valve, and the surface 70a faces the battery 100. The member 70b extends parallel to the direction toward the vent 22 of the exhaust passage 60. When opened, the one-way open valve including the member 70b, which effectively directs flow of the gas, can cause the gas to be further quickly expelled to outside the case 20.

Figure 6:
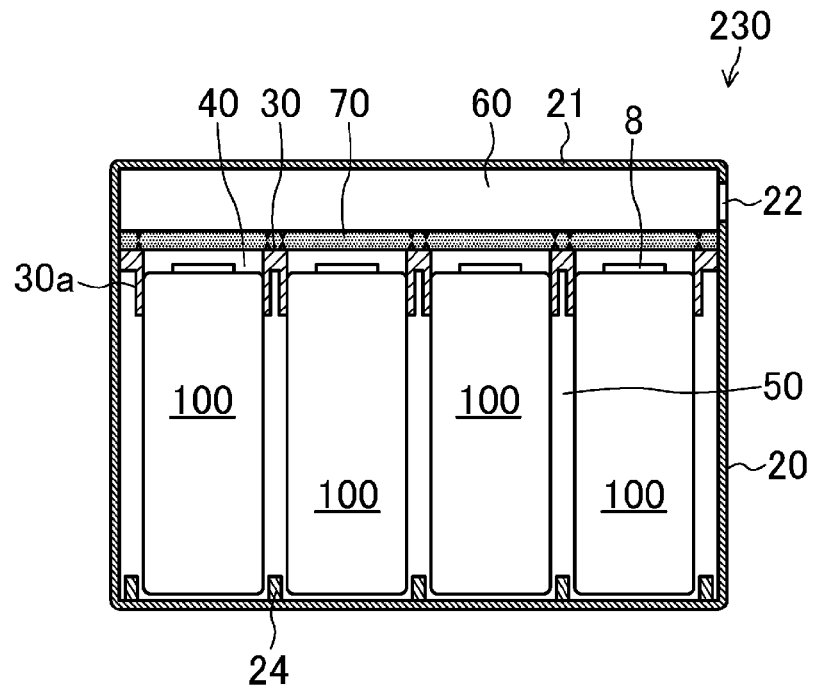
FIG. 6 is a cross-sectional view schematically illustrating a configuration of a battery module according to another variation of the first embodiment.

FIG. 6 is a cross-sectional view schematically illustrating a configuration of a battery module 230 according to another variation of the first embodiment. This variation exemplifies another form of the connection passages 40 illustrated in FIG. 3(a), and has the same configuration as that of the battery module 210 except for the connection passages.

As illustrated in FIG. 6, the flat palate 30 has a plurality of hollow members 30a formed thereon. The inner periphery of each of the hollow member 30a is engaged with the outer periphery of the battery case of an associated one of the batteries 100. In this variation, the hollow members 30a form the connection passages 40. The hollow members 30a may be formed integrally with the flat plate 30, or may be joined to the flat plate 30 having through holes.

Figure 7:
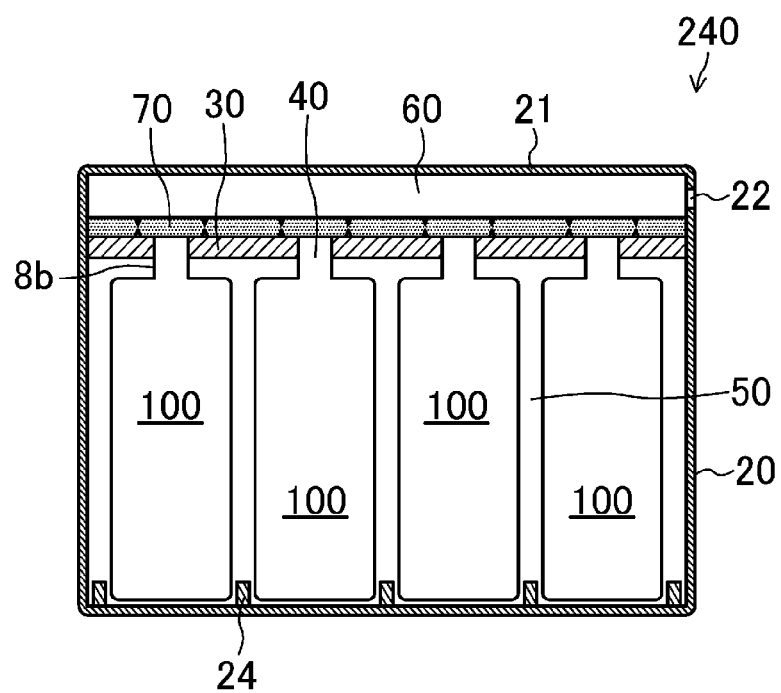
FIG. 7 is a cross-sectional view schematically illustrating a configuration of a battery module according to another variation of the first embodiment.

FIG. 7 is a cross-sectional view schematically illustrating a configuration of a battery module 240 according to another variation of the first embodiment. This variation exemplifies another form of the connection passages 40 illustrated in FIG. 3(a), and has the same configuration as that of the battery module 210 except for the connection passages.

As illustrated in FIG. 7, each of the batteries 100 has a protrusion 8b extending with an end opened and engaged with the inner surface of an associated one of the through holes of the flat plate 30. In this variation, the protrusions 8b form the connection passages 40. The protrusions 8b may also serve as the positive electrode terminal. In such a case, since each of the protrusions 8b has an opened end, it is not necessary to provide the opening portions 8a as illustrated FIG. 1.

Meanwhile, in the first embodiment, the flat plate 30 provided in the case 20 separates the accommodation section 50 configured to accommodate the batteries 100 from the exhaust passage 60 configured to expel the gas released from at least one of the opening portions 8a of the batteries 100. The flat plate 30 may be made of a circuit board having a function of electrically connecting the batteries 100 to one another.

FIGS. 8(a)-8(d) are exploded perspective views illustrating a configuration of a battery module having the flat plate 30 made of a circuit board. FIG. 9 is a perspective view illustrating an assembled battery module 300. Note that the connecting structure of the batteries 100 which is described in this variation imposes no limitation on the mechanism for expelling gas described in the first embodiment.

Figure 8:
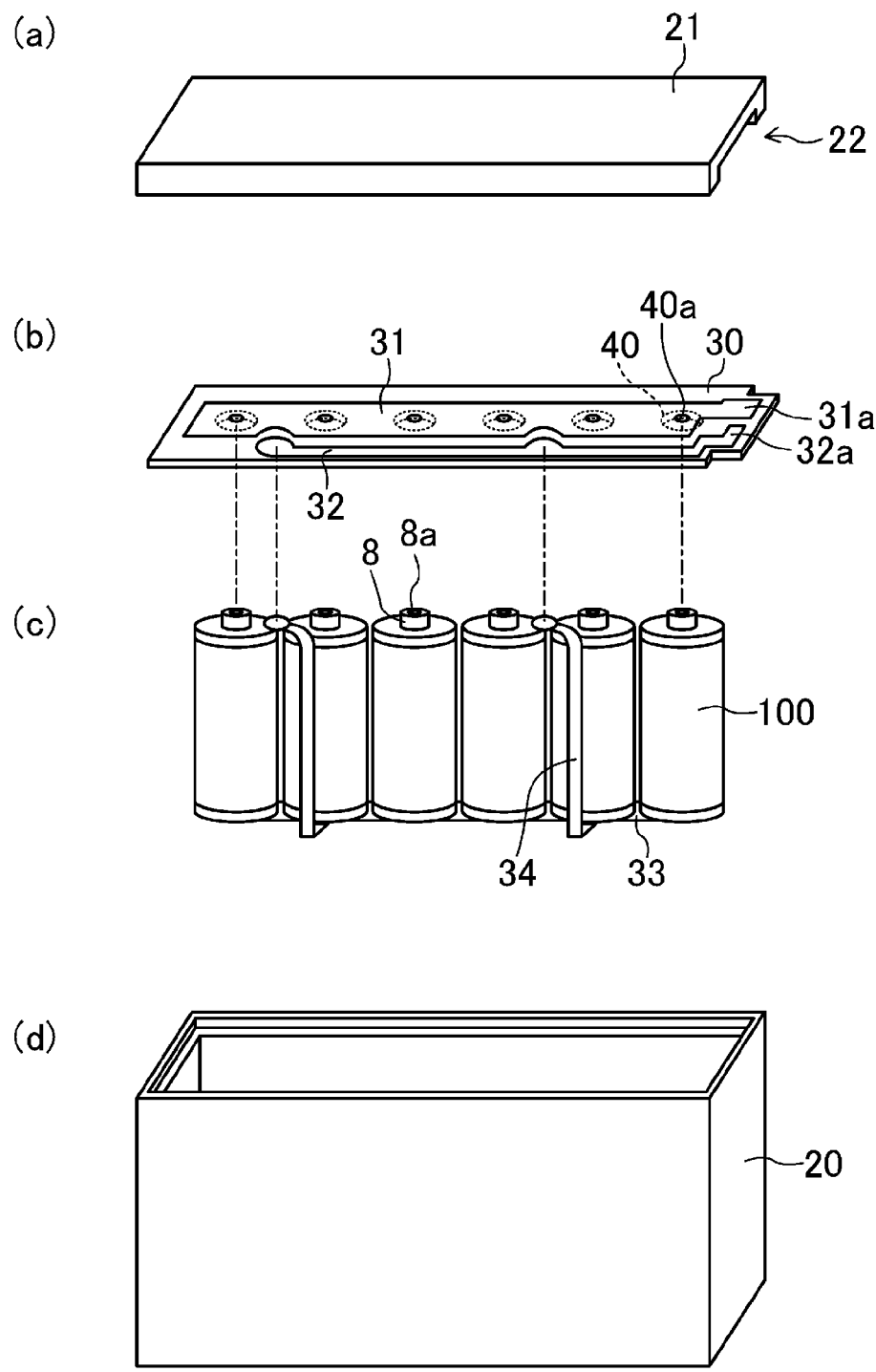
FIGS. 8(a)-8(d) are exploded perspective views illustrating a configuration of a battery module having a flat plate made of a circuit board.
Figure 9:
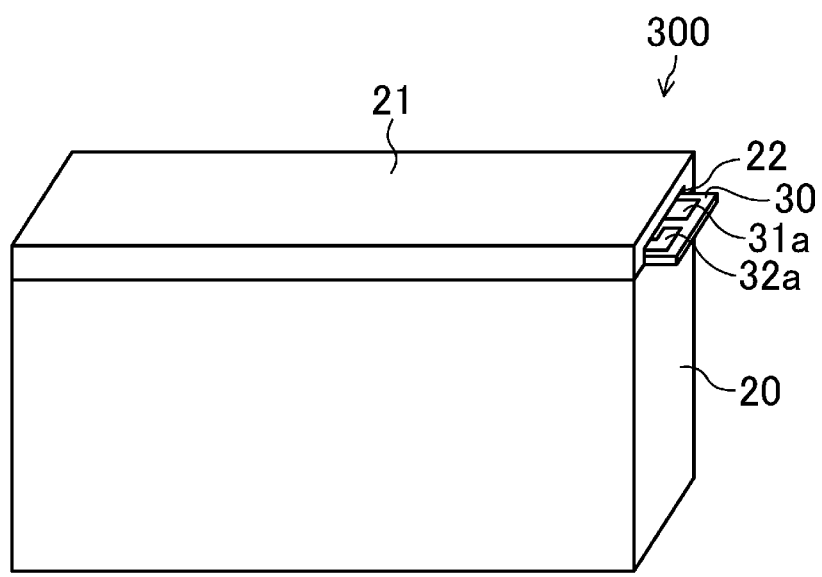
FIG. 9 is a perspective view illustrating the battery module of FIGS. 8(a)-8(d) after assembly.

As illustrated in FIG. 8(b), the circuit board 30 has through holes 40 formed therein, and a positive electrode connector 31 and a negative electrode connector 32 are formed on a surface of the circuit board 30. The positive electrode connector 31 has openings 40a formed at the positions corresponding to the through holes 40. Each of protrusions of the positive electrode terminals 8 of the batteries 100 is inserted into an associated one of the through holes 40 of the circuit board 30 to be connected to the positive electrode connector 31 formed on the circuit board 30. The negative electrode terminals of the batteries 100 (the bottom portions of the battery cases) are connected in parallel by a negative electrode bus bar 33, and conductor parts 34 extending from portions of the negative electrode bus bar 33 connect the negative electrode terminals to the positive electrode connector 32 formed on the circuit board 30. In this manner, the batteries 100 are connected in parallel via the positive and negative electrode connecters 31 and 32 formed on the circuit board 30. As illustrated in FIG. 9, an end 31a of the positive electrode connecter 31 and an end 32a of the negative electrode connector 32 protrude outside from the vent 22 formed on a lid 21 of the case 20 to serve as external terminals of the battery module 300.

Note that, in this variation, the connection passages 40 are constituted of the through holes 40 of the circuit board 30 and the openings 40a of the positive electrode connector 31.

FIGS. 10(a)-10(e) are exploded perspective views illustrating another configuration of a battery module having the flat plate 30 made of a circuit board. FIG. 11 is a perspective view illustrating an assembled battery module 310.

Figure 10:
FIGS. 10(a)-10(e) are exploded perspective views illustrating another configuration of the battery module having the flat plate made of a circuit board.
Figure 10:
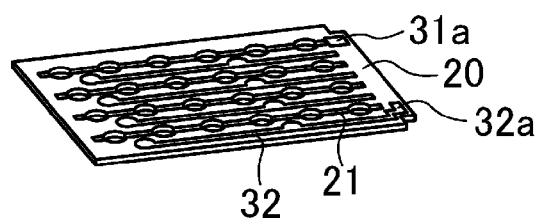
Figure 10:
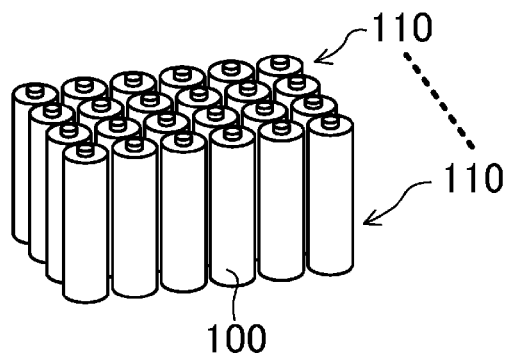
Figure 10:
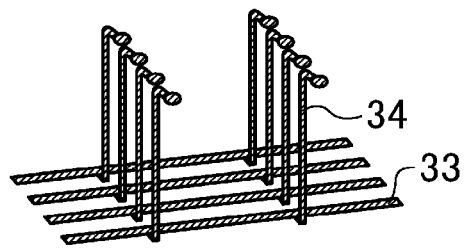
Figure 10:
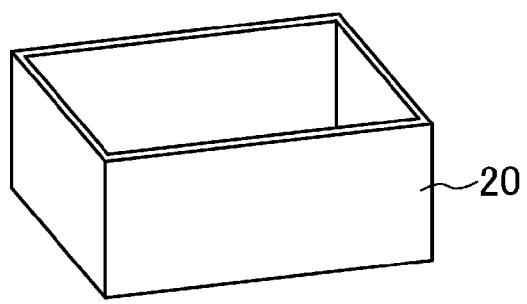
Figure 11:
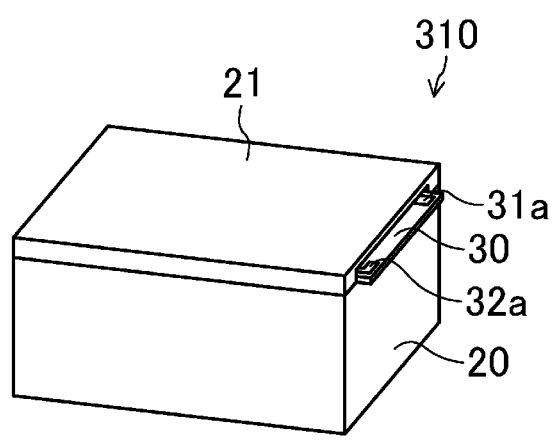
FIG. 11 is a perspective view illustrating the battery module of FIGS. 10(a)-10(e) after assembly.

As illustrated in FIG. 10(c), in this variation, a plurality of battery assemblies 110, each of which includes a plurality of batteries 100 arranged in a line, are connected in parallel.

The connecting structure of the batteries 100 is the same as the structure illustrated in FIGS. 8(a) and 8(b), except that adjacent ones of the battery assemblies 110 are connected in series by connecting the positive and negative electrode connectors 31 and 32 illustrated in FIG. 10(b) to each other.

The present disclosure has been described with the above preferred embodiment. Note that the descriptions of the embodiment are not to limit the present disclosure, and various changes and modifications may be made. For example, although lithium ion secondary batteries are used as the batteries 100 constituting the battery modules in the above embodiment, other types of secondary batteries (e.g., nickel-hydrogen batteries) may also be used. The battery 100 may be a cylindrical battery, a rectangular battery, or a laminated battery.

The one-way open valve may be a restorable valve. For example, the open valve may be made of an elastic body such as resin, rubber or a metallic coil such that the open valve restores a sealing state when a pressure applied to the valve falls below a predetermined value. Alternatively, the valve may be made of a shape-memory alloy such that the valve restores a predetermined shape when the valve is cooled after the high-temperature gas has passed therethrough.

INDUSTRIAL APPLICABILITY

The battery module of the present disclosure can be suitably used, for example, as power supplies for mobile electronic devices such as personal computers and cellular phones, or as power supplies for driving power tools or electric vehicles.

DESCRIPTION OF REFERENCE CHARACTERS

1 Positive electrode
2 Negative electrode
3 Separator
4 Electrode group
5 Positive electrode lead
6 Negative electrode lead
7 Battery case
8 Terminal plate (Positive electrode terminal)
8a Opening portion
8b Protrusion
9, 10 Insulating plate
11 Gasket
12 Filter
12a, 13a Through hole
13 Inner cap
14 Release valve
20 Case
21 Lid
22 Vent
23 Bottom portion
24 Rib
30 Flat plate (Circuit board)
30a Hollow member
31 Positive electrode connector
31a End of positive electrode connector
32 Negative electrode connector
32a End of negative electrode connector
33 Negative electrode bus bar
34 Conductor part
40 Connection passage (Through hole)
40a Opening
50 Accommodation section
60 Exhaust passage
70 One-way open valve (Plate member)
70b Member
71 Thinner portion
72 Non-rupturable portion
100 Battery
110 Battery assembly
200, 210, 220, 230, 240 Battery module
300, 310 Battery module

The invention claimed is:
1. A battery module, comprising
batteries which are accommodated in a module case, wherein:
the batteries each include an opening portion configured to release gas produced in an associated one of the batteries to outside the battery,
the module case is partitioned into an accommodation section configured to accommodate the batteries and an exhaust passage configured to expel the gas released from at least one of the batteries to outside the case, the exhaust passage being located inside the module case, sealed connection passages are provided between the accommodation section and the exhaust passage, each of the sealed connection passages being located between the opening portion of each of the batteries and the exhaust passage, and one-way open valves provided at the sealed connection passages, respectively, each of the one-way open valves being configured to open only along a direction from the opening portion of each of the batteries to the exhaust passage, and each of the one-way open valves being provided in an intermediate portion or at an end of an associated one of the sealed connection passages, wherein the accommodation section is sealed when all of the one-way open valves are in a blocking state.

2. The battery module of claim 1, wherein
the case is partitioned into the accommodation section and the exhaust passage by a flat plate placed in the case.

3. The battery module of claim 2, wherein:
the opening portion is provided in a protrusion of each of the batteries,
the flat plate is placed in such a manner that the protrusion of each of the batteries is inserted into an associated one of through holes formed in the flat plate and battery cases of the batteries are in contact with the flat plate at portions surrounding the protrusion, and
the through holes respectively form the sealed connection passages.

4. The battery module of claim 2, wherein:
the flat plate includes a plurality of hollow members formed thereon,
an inner periphery of each of the hollow members is engaged with an outer periphery of an associated one of the battery cases of the batteries, and
the hollow members form the sealed connection passages.

5. The battery module of claim 3, wherein:
the protrusion of each of the batteries extends with an end opened and is engaged with an inner surface of an associated one of the through holes of the flat plate, and
the protrusion forms the sealed connection passages.

6. The battery module of claim 3, wherein:
a plate member is placed in contact with a surface of the flat plate facing the exhaust passage so as to close the through holes of the flat plate,
the plate member includes thinner portions formed in regions which are located near the through holes and in contact with the flat plate, and
each of the thinner portions constitutes each of the one-way open valves.

7. The battery module of claim 6, wherein:
the plate member further includes non-rupturable portions formed in the regions being in contact with the flat plate, and
when in an opened state, each of the one-way open valves is positioned such that flow of the gas having been released from the opening portion of an associated one of the batteries to the exhaust passage through an associated one of the sealed connection passages is directed toward a vent of the exhaust passage.

8. The battery module of claim 2, wherein
the flat plate is made of a circuit board on which a connector electrically connecting electrodes of the batteries is formed.

9. The battery module of claim 1, wherein
each the sealed connection passages is surrounded by an associated one of the one-way open valves, a part of the flat plate and an associated one of the batteries.

10. The battery module of claim 1, wherein
each of the one-way open valves faces one end of an associated one of the batteries along a longitudinal direction of the associated one of the batteries.

11. The battery module of claim 1, wherein
the one-way open valves are provided at the flat plate.

* * * * *